Patented Aug. 14, 1945

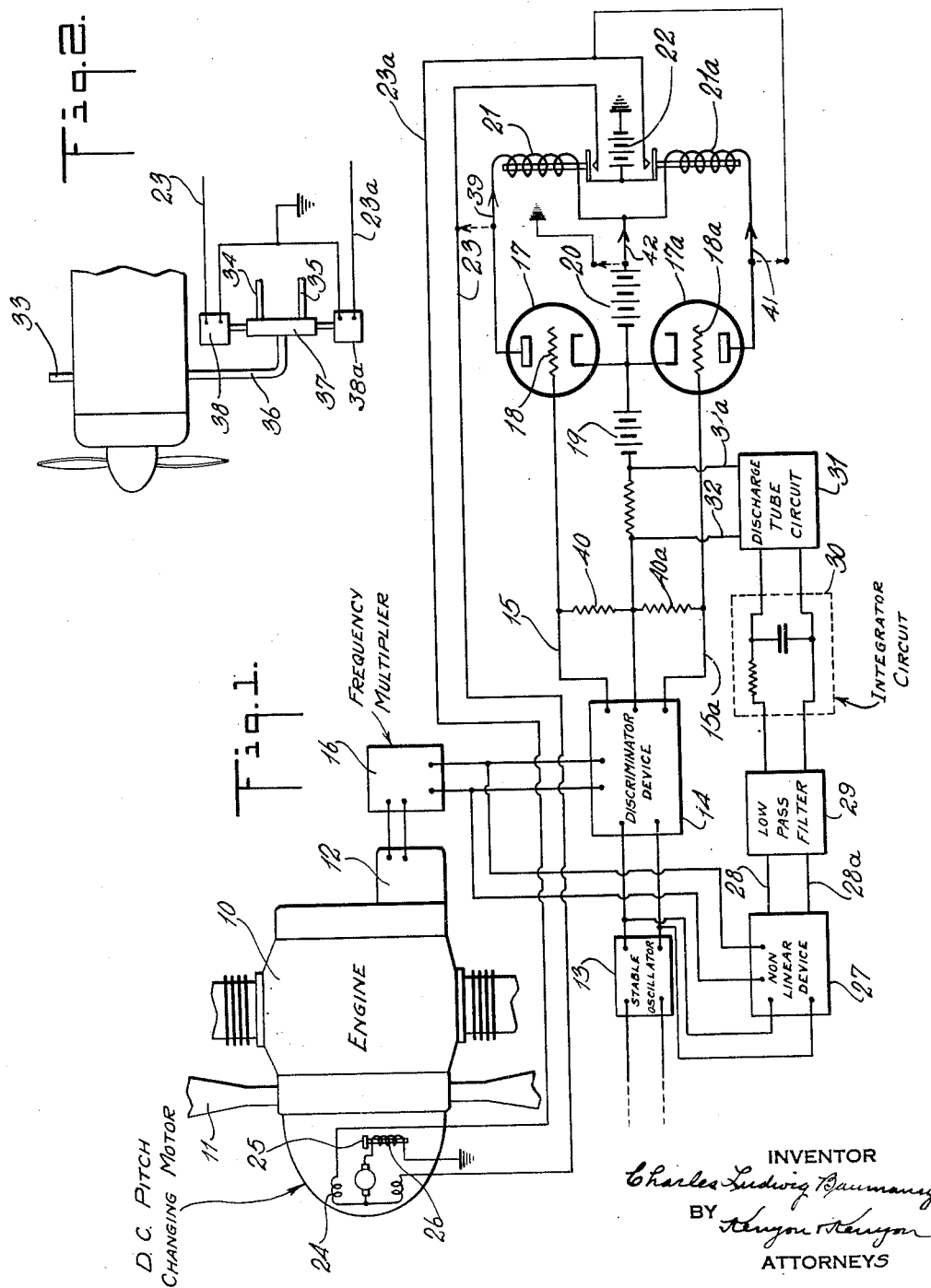

2,382,847

UNITED STATES PATENT OFFICE 2,382,847

CONTROL APPARATUS FOR ENGINES

Charles Ludwig Baumann, Jr., New York, N. Y.

Application June 16, 1942, Serial No. 447,261

5 Claims. (Cl. 175—355)

This invention relates to control apparatus for engines. It relates especially to electrical control apparatus for maintaining the speed of an engine in predetermined relationship to a control, which control may be maintained constant or may be varied at the election of the operator. It is a purpose of this invention to provide apparatus which eliminates moving parts and to effect the control of an engine by electric circuit means so as to control the engine speed in relation to a source of constant frequency electric current.

One of the features of this invention resides in the utilization of a discriminator device whereby a current of controlled frequency is brought into reactive relationship with a current the frequency of which varies with varying speeds of the engine to be controlled and whereby there is a voltage established whenever the speed of the engine varies from a predetermined relationship with the frequency of the control frequency electric current. Moreover, the discriminator device establishes the voltage output in one line or another, depending upon whether the engine speed is greater than or less than the predetermined relationship of engine speed to controlled frequency electric current. It is a further feature of this invention that a controlled frequency electric current is brought into reactive relationship with the variable frequency electric current, which frequency varies upon varying the engine speed so as to produce beats, and that these beats are utilized in controlling the current to the pitch-changing motor so that the pitch-changing motor will operate in pulsations. The more the engine speed departs from the speed to be maintained, the greater the frequency of the beats and, in turn, the greater the frequency of the pulsations, so that the total period of operation of the propeller pitch-changing motor during a given interval of time will be greater the greater the extent to which the engine speed departs from the speed to be maintained.

Having thus indicated in a general way the purpose and nature of the present invention, it will now be described in connection with certain illustrated embodiments which are described in order to afford a better understanding of this invention, but only for purposes of exemplification, said illustrative embodiments being shown in the accompanying drawing wherein Figure 1 is a schematic view of one type of controlled apparatus in connection with electric propeller pitch-changing means; and Fig. 2 is a schematic showing illustrating the use of the control apparatus for regulating the action of a hydraulic pitch-changing motor.

In Fig. 1, the engine 10 operates a propeller 11. Driven by the engine in any suitable way is an alternator 12 which may, for example, be part of a tachometer.

A constant frequency electric current is generated by the stable oscillator 13 which may, for example, be a constant speed direct current motor which operates an alternator at constant speed, thereby setting up a constant frequency alternating current. It is to be understood, however, that other sources of constant frequency electric current may be used. For example, a vacuum tube oscillator of any of the well-known types may be used, either singly or in combination or with or without piezoelectric stabilization or with or without magnetostriction stabilization. Alternatively, a gas discharge oscillator (e. g., a neon tube with suitable devices to secure symmetrical wave form) may be used or a dynatron oscillator or a grid glow tube (thyratron) oscillator or a vacuum tube with amplifier with tuning fork and/or microphone control (only when a single frequency is desired) or a mechanical vibrator driven from the direct current source or a chemical interrupter or the like. The number and kinds of known devices which can be used to produce a controlled frequency alternating current are great and it is largely optional which device is used as a source of constant frequency alternating current, although the control of the frequency of the output should, of course, be as accurate as possible.

The alternator 12, which generates a current the frequency of which varies with variations of speed of the engine, and the stable oscillator 13 are connected to the discriminator device 14 which is indicated diagrammatically in the drawing. Circuits for the discriminator device are well known, and for this reason the circuit is not shown in detail in the drawing. It is believed sufficient to state that, when the frequencies generated by the alternator 12 and the oscillator 13 are identical, there is no net voltage generated across resistors 40 and 40a. However, if the engine speed is greater than the desired speed to be maintained so that the frequency generated by alternator 12 is greater than that generated by the oscillator 13, then the positive voltage will be developed in line 15. When the engine speed is less than the desired speed, a positive voltage would be generated across resistor 40a, which leads from the discriminator device.

With the foregoing, it is preferable to include a frequency multiplier 16 whenever this may facilitate the matching of the frequency of the current generated by the alternator 12 with the frequency of the current generated by the oscillator 13.

Thermionic tubes 17 and 17a include the grid elements 18 and 18a which are normally biased to cut off the tubes 17 and 17a by means of the battery 19 as shown.

The plate circuits of the tubes 17 and 17a are supplied by the battery 20 and, when current can flow through these circuits, the circuits actuate the relays 21 and 21a respectively which control the lines leading to a reversible direct current propeller blade pitch-changing motor. The current for operating the propeller blade pitch-changing motor is supplied by the battery 22. When the relay 21 is actuated, the current flows through the line 23 to operate the propeller blade pitch-changing motor 24 in one direction. When the relay 21a is actuated, current flows through line 23a to operate the propeller blade pitch-changing motor in the opposite direction. A braking member 25 may normally keep the motor from revolving, and this braking member is released by current flowing through the solenoid 26 whenever the propeller blade pitch-changing motor is operated.

Considering the foregoing apparatus without the remainder of the apparatus to be described, it is operative to control the pitch of the propeller blade so as to control the speed of the engine in the following manner. Assuming that a battery 19 maintains the grids 18 and 18a so as to adjust by bias the tubes 17 and 17a to cut-off, it is apparent that any voltage generated in line 15 or 15a will lower the negative voltage imposed on the grid 18 or 18a as the case may be so that current may flow therethrough. Therefore, as long as no voltage is developed either in line 15 or 15a by the discriminator device 14, the propeller blade pitch-changing motor is not operated. If voltage is generated in the line 15 so as to permit current to flow through the tube 17, then the motor 24 is operated in one direction; while, if voltage is developed in line 15a so as to permit current to flow through tube 17a, then the motor 24 is operated in the opposite direction.

It is frequently desirable to have the propeller blade pitch-changing motor operated in a proportional manner. This can be done by arranging the tubes 17 and 17a so that the voltages generated across resistors 40 and 40a will not diminish the bias maintained on the grids 18 or 18a sufficiently to permit current to flow through the plate circuits of tubes 17 or 17a. However, an additional voltage is imposed on the lines 15 and 15a by a tube-discharging circuit in pulsations so that these pulsations for the duration thereof and at the frequency thereof will permit current to flow through the plate circuits of the tubes 17 or 17a and actuate the motor.

Another method of proportional operation (in opposition to the "pulsing" method) consists of a steady flow of current to the pitch-changing motor 24. This flow of current can be varied continuously in a gradual (or instantaneous) manner in accordance with voltage changes across resistors 40 and 40a which are in the circuits or grids 18 and 18a respectively as by moving the switches 39, 41 and 42 to the positions shown in dotted lines.

The resultant plate currents (possibly after further amplification) could control two tubes of sufficient power-handling capacity to work the two field windings of the motor 24 directly—without recourse to the non-linear device 27 and associated circuits.

The "pulsing" method of proportional operation may be accomplished as follows.

Current from the alternator 12 is taken to any suitable non-linear device 27. Current from the stable oscillator 13 is also taken to the non-linear device 27. The non-linear device may be of any suitable type such as a converter tube or a mixture tube or a diode rectifier tube. Alternatively, a copper oxide rectifier may be used or a selenium rectifier. The non-linear device 27 causes certain beat frequencies to be developed in lines 28 and 28a which lead to the low-pass filter 29 of any suitable type and of which many are known that permit a selected beat frequency to pass therethrough to the integrator circuit means 30. The function of the integrator circuit means is to decrease the frequency of the beats passing through the low-pass filter so that a desired frequency can be maintained, e. g., a beat frequency of four per second. The integrator circuit means is not necessary if the non-linear device is adapted to establish beats of sufficiently low frequency.

The beats coming from the circuit integrator serve to trigger the tube-discharging circuit means 31. Any suitable device may be used for this purpose and it may include, for example, means for discharging a condenser through a resistance so that the current in passing through the resistance will require a specified interval of time for the discharge of the condenser. There are many known circuits whereby electrical beats of the type mentioned hereinabove may be used to trigger the discharge of a condenser in the manner aforesaid.

The current discharged from the tube-discharging circuit 31 through lines 32 and 32a has its voltage imposed on the voltage produced in lines 15 or 15a by the discriminator device. By arranging the apparatus so that a voltage sufficient to permit current to flow through the plate circuits of tubes 17 and 17a will be generated by the tube-discharging device for a predetermined interval of time, e. g., one-fourth of a second, relays 21 and 21a can be actuated for a like period for operating the propeller blade pitch-changing motor 24. When the speed of the engine is only slightly different from the desired engine speed, then the beats will be infrequent and the pitch of the propeller will be adjusted gradually. For greater differences of engine speed from desired speed, the beats will become more frequent with more frequent impulses imparted to the motor 24. Eventually, the beats will be so frequent that the pulsations will become continuous and provide a continuous supply of current to the pitch-changing motor.

It is apparent that the foregoing device can also be used to operate a hydraulic pitch-changing motor as indicated diagrammatically by reference to Fig. 2. The hydraulic pitch-changing motor may be of the type that is operated by a difference of hydraulic pressure in one direction or the other. For example, the line 36 may be maintained at a pressure of 200 pounds per square inch. The lines 34 and 35 may be maintained at 400 and 0 pounds per square inch respectively. When the line 36 is connected to the line 34, the motor will operate in one direction, and when the line 36 is connected to line 35 the motor will operate in the other direction. This may be accomplished by the valve 37 which normally is in shut-off position and which can be operated by the solenoid 38 to connect line 36 with line 34 and by solenoid 38a to connect line 36 with line 35. The solenoids 38 and 38a are actuated by current in lines 23 and 23a which is created and under the control of the apparatus shown in Fig. 1 which has been described hereinabove.

While this invention has been described in connection with certain specific embodiments thereof, it is to be understood that this invention may be incorporated in many different embodiments and may be made by utilizing various circuit means so as to be within the concept of my invention, and it is to be understood that the embodiments of this invention that have been specifically described and shown in the drawing are merely exemplary of my invention, the scope of which is defined in the language of the accompanying claims.

I claim:

1. Control system component for controlling the speed of an engine and comprising output terminals adapted for connection to an engine control motor circuit, said engine control component comprising means for generating a first electric current having a controlled frequency, means for generating a second electric current the frequency of which varies with variation of the speed of said engine, a discriminator device connected to the circuits of said first and second electric currents adapted to produce a voltage upon variation of the frequency of said second electric current as determined by the speed of said engine from desired predetermined relationship between the frequencies of said first and second electric currents at a first part when the engine speed is greater than, and at a second part when the engine speed is less than, the speed at which said predetermined relationship between the frequencies of said first and second electric currents occurs, beat generating means separate from said discriminator device and connected to said means for generating said first and second electric currents on the input side of said discriminator device for generation of beats which beats are produced by the interaction of the said first and second electric currents whenever the frequency of said second electric current departs from said predetermined relationship between the frequencies of said first and second electric currents and the frequency of which beats is increased upon increased departures in either direction of the frequency of said second electric current from the aforesaid predetermined relationship between the frequencies of said first and second electric currents, and means for supplying energy to said output terminals in a direction depending upon which of said first and second parts is supplied with voltage by said discriminator device and in impulses the frequency of which varies responsive to the frequency of the beats generated by said beat generating means.

2. Control system component for controlling the speed of an engine and comprising output terminals adapted for connection to an engine control motor circuit, said engine control component comprising means for generating a first electric current having a controlled frequency, means for generating a second electric current the frequency of which varies with variation of the speed of said engine, a discriminator device connected to the circuits of said first and second electric currents adapted to produce a voltage upon variation of the frequency of said second electric current as determined by the speed of said engine from desired predetermined relationship between the frequencies of said first and second electric currents at a first part when the engine speed is greater than, and at a second part when the engine speed is less than, the speed at which said predetermined relationship between the frequencies of said first and second electric currents occurs, beat generating means separate from said discriminator device and connected to said means for generating said first and second electric currents on the input side of said discriminator device for generation of beats which beats are produced by the interaction of the said first and second electric currents whenever the frequency of said second electric current departs from said predetermined relationship between the frequencies of said first and second electric currents and the frequency of which beats is increased upon increased departures in either direction of the frequency of said second electric current from the aforesaid predetermined relationship between the frequencies of said first and second electric currents, voltage supply means connected to the output of said beat generator means for supplying voltage of predetermined intensity and duration at intervals the frequency of which is determined by the frequency of the beats generated by said beat generating means, means for imposing said voltage supplied by said voltage supply means on said first and second parts, and means for supplying energy to said output terminals in a direction depending upon which of said first and second parts is supplied with voltage by said discriminator device and in impulses the frequency and duration of which are determined by the frequency and duration of the voltage impulses imposed on said first and second parts by said voltage supply means.

3. Apparatus for controlling the speed of an engine comprising means for generating a first electric current having a controlled frequency, a movable part movement of which controls the speed of the engine, means for generating a second electric current the frequency of which varies with variation of the speed of said engine, a discriminator device connected to the circuits of said first and second electric currents adapted to produce a voltage upon variation of the engine speed from the desired predetermined relationship between the speed of the engine and the frequency of said controlled frequency electric current at a first part when the engine speed is greater than, and at a second part when the engine speed is less than, the speed of said predetermined relationship, a trigger device actuatable to release a voltage potential of predetermined intensity and duration, beat generator means comprising a non-linear device connected to said first and second circuits for generation of beats the frequency of which is increased at increased departures of the engine speed from the desired predetermined relationship between engine speed and the frequency of said controlled frequency electric current, means including a low pass filter and an integrator circuit interposed between said beat generator means and said trigger device for actuating said trigger device at intervals determined by the frequency of the beats generated by said beat generator means, and power supply means for moving said movable part in one direction or the other responsive to the development of voltage at said first part or at said second part and in impulses the duration and frequency of which are responsive to and determined by the duration and frequency of voltage potential released by said trigger device.

4. Control system component for controlling the speed of an engine and comprising output terminals adapted for connection to an engine control motor circuit, said control system component comprising means for generating a first electric current having a controlled frequency, means for generating a second electric current the frequency of which varies with variation in the speed of said engine, a discriminator device connected to the circuits of said first and second electric currents adapted to produce a voltage variation upon variation of the frequency of said second electric current as determined by the speed of said engine from desired predetermined relationship between the frequencies of said first and second electric currents at a first part when the engine speed is greater than, and at a second part when the engine speed is less than, the speed at which said predetermined relationship between the frequencies of said first and second electric currents occurs, pulse generating means separate from said discriminator device and connected to said means for generating said first and second electric currents on the input side of said discriminator device for developing voltage pulsations the frequency of which is increased upon increased departures in either direction of the frequency of said second electric current from the aforesaid desired predetermined relationship between the frequencies of said first and second electric currents, means for imposing said voltage pulsations produced by said pulse generating means upon said first and second parts, a first thermionic tube having its grid connected to said first part, a second thermionic tube having its grid connected to said second part, a first output circuit which is controlled by said first thermionic tube and which includes one of said output terminals, a second output circuit which is controlled by said second thermionic tube and which includes another of said output terminals, means for normally biasing said thermionic tubes to cut off, means for supplying energy to said first output circuit and to said output terminal included therein responsive to the imposition on the grid of said first thermionic tube of the voltage supplied to said first part by said discriminator device and in impulses determined by the frequency of the voltage pulsations imposed on said grid of said first thermionic tube by the voltage pulsations supplied to said first part by said pulse generating means, and means for supplying energy to said second output circuit and to said output terminal included therein responsive to the imposition on the grid of said second thermionic tube of the voltage supplied to said second part by said discriminator device and in impulses determined by the frequency of the voltage pulsations imposed on said grid of said second thermionic tube by the voltage pulsations supplied to said second part by said pulse generating means.

5. Control system component for controlling the speed of an engine and comprising output terminals adapted for connection to an engine control motor circuit, said control system component comprising means for generating a first electric current having a controlled frequency, means for generating a second electric current the frequency of which varies with variation in the speed of said engine, a discriminator device connected to the circuits of said first and second electric currents adapted to produce a voltage variation upon variation of the frequency of said second electric current as determined by the speed of said engine from desired predetermined relationship between the frequency of said first and second electric currents at a first part when the engine speed is greater than, and at a second part when the engine speed is less than, the speed at which said predetermined relationship between the frequencies of said first and second electric currents occurs, pulse generating means separate from said discriminator device and connected to said means for generating said first and second electric currents on the input side of said discriminator device for developing voltage pulsations the frequency of which is increased upon increased departures in either direction of the frequency of said second electric current from the aforesaid desired predetermined relationship between the frequencies of said first and second electric currents, means for imposing said voltage pulsations produced by said pulse generating means upon said first and second parts, and means for supplying energy to said output terminals in a direction depending upon which of said first and second parts is subjected to voltage variation by said discriminator device and in impulses the frequency of which is determined by the frequency of the voltage pulsations imposed on said first and second parts by said pulse generating means.

C. LUDWIG BAUMANN, Jr.